Figure 1:
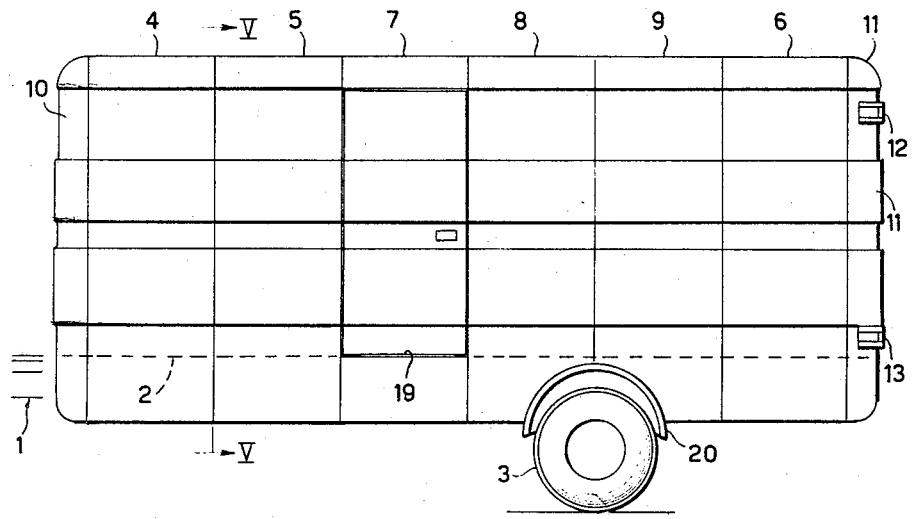

May 31, 1966      T. ZIJLSTRA      3,253,855

TRUCK BODY AND A SUPERSTRUCTURE THEREOF

Filed Dec. 23, 1963      4 Sheets-Sheet 1

Inventor:
TJEERD ZIJLSTRA
by *Otto John Munz*
attorney

May 31, 1966        T. ZIJLSTRA        3,253,855
TRUCK BODY AND A SUPERSTRUCTURE THEREOF
Filed Dec. 23, 1963        4 Sheets-Sheet 2
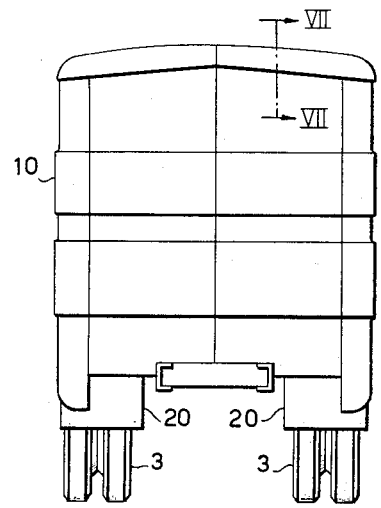
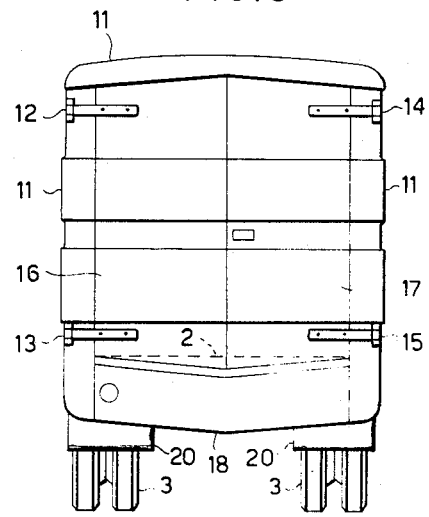
Inventor:
TJEERD ZIJLSTRA
by

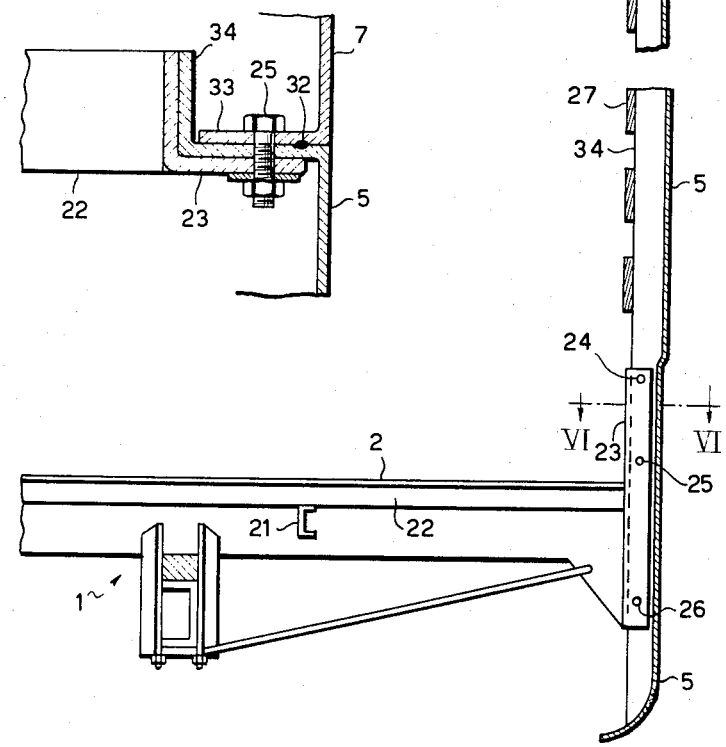

May 31, 1966 T. ZIJLSTRA 3,253,855
TRUCK BODY AND A SUPERSTRUCTURE THEREOF
Filed Dec. 23, 1963 4 Sheets-Sheet 4
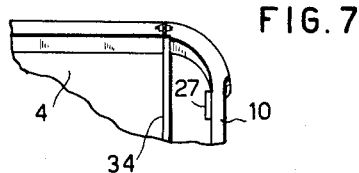
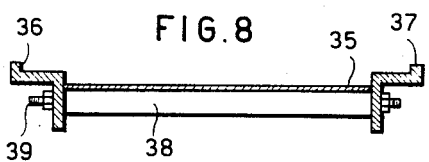
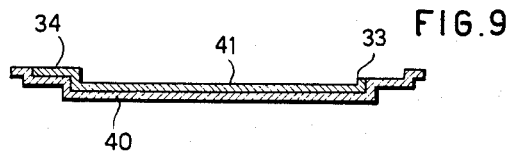
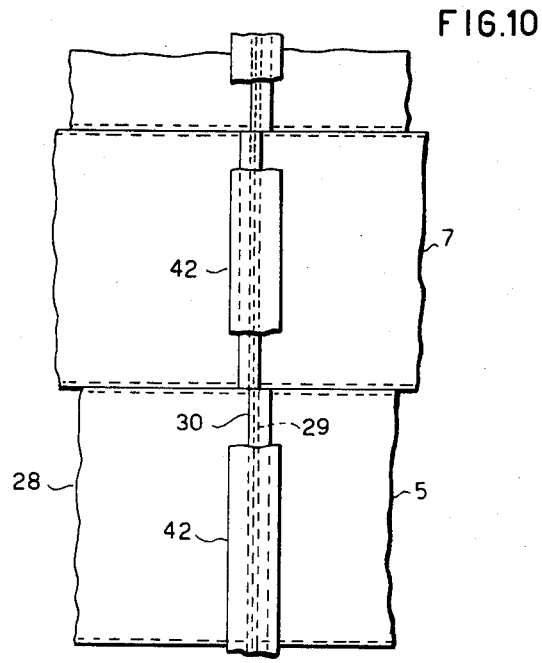
Inventor:
TJEERD ZIJLSTRA
by

United States Patent Office 3,253,855
Patented May 31, 1966

3,253,855
TRUCK BODY AND A SUPERSTRUCTURE THEREOF
Tjeerd Zijlstra, Uiterburen 55, Zuidbroek, Netherlands
Filed Dec. 23, 1963, Ser. No. 332,373
Claims priority, application Netherlands, Dec. 27, 1962, 287,233
1 Claim. (Cl. 296—31)

The invention relates in the first place to a truck body comprising a floor attached to the truck chassis, and a superstructure which is also attached to said chassis.

Although the invention will hereinafter be described with reference to truck bodies which are permanently attached to the chassis of vehicles, it is also considered to relate to truck bodies which are removably attached to a chassis, irrespective of whether the chassis is intended for road or railway vehicles.

On truck bodies various demands may be made, both from a technical and an economical point of view. A prerequisite is that the truck body should have a low weight so that the desired or permitted wheel pressure will allow the transport of a heavier load. Moreover, in many countries road-tax is dependent on the weight of the vehicle including the body. A light-weight body consequently implies that for a given load capacity this road-tax will be lower.

However, the saving in weight may certainly not be at the expense of the necessarily high strength of the construction. By preference the truck body should be corrosion resistant, which may be obtained by choosing a suitable material or by subjecting it to a special painting treatment, in order to prolong its life.

A known construction of a truck body comprises a steel floor frame on which a light-metal skeleton is built up, which skeleton is covered with light-metal sheets.

The invention has for its object to provide a simpler, more rapid, and especially less costly truck body and method of manufacturing such a truck body. Moreover, the truck bodies obtained according to the invention are considerably lighter than the known ones.

The present invention consists in that the superstructure consists of self-supporting panels of synthetic material which are made rigid by so moulding them that at the joining edges they are provided with flanges, and at least some of the panels extend for the entire height of the superstructure and for half the width of the roof.

The self-supporting panels do not require a skeleton to be built up on the floor frame. The flanges are clamped together on the inside of the vehicle, so that on the outside of the body no connections of body parts are visible. Many known synthetic materials may in a simple manner be moulded into all kinds of flanged articles. Moreover they are extremely light as compared with metals.

It has been found that the truck body thus obtained has several additional advantages.

For instance, the panels may be adjoined in such a manner that the wall on the outside is very smooth and straight.

Another considerable advantage is that the plastics construction, in contradistinction to the metal truck body, hardly develops any noise when the truck is riding. This is partly due to a more rigid construction but mainly to synthetic materials absorbing noise to a far greater extent than do metals.

The resistance to corrosion of a very great number of synthetic materials is generally known. Of this property great advantage is taken in the novel construction.

Moreover, the body panels applied render any painting superfluous. For the synthetic materials may generally be mixed with all kinds of pigments before being moulded into panels. In this way very attractive and fast colors may be realized. It is even possible to mould various panels from differently colored or even uncolored synthetic materials.

A particular advantage of the novel truck body consists in that in the event of damage, for instance as a result of a collision, one or more of the damaged wall panels may simply be replaced by new ones. Since the panels are self-supporting there is of course no chance of skeleton damage. The simple replacing of exchangeable panels has now come in the place of the costly aligning of such a skeleton.

Of the synthetic materials to be used, epoxy resins, for instance, are very suitable. But these resins are very costly. Considerably cheaper, and surprisingly suitable for the purpose envisaged, however, are according to the invention self-supporting panels made of fiberglass reinforced polyester resin.

It should be noted that it has already been proposed previously that this material should be used for the manufacture of sheets, profiled sections or, for instance, even complete boats.

In that case the articles were moulded in one piece, instead of manufacturing them from self-supporting panels, such as the truck body according to the invention.

The panels may be joined by cementing or welding the flanges. It has been found suitable too to join the panels by means of bolts through the flanges.

According to the invention the truck body is so constructed that the longitudinal wall is made up of substantially equal panels of equal width, each of which extends for the entire height of said wall and for half the width of the roof.

Preference is given to side wall panels measuring about 1 m. in width.

The advantages of the use of such standardized wall panels will be obvious. For with such equal panels manufactured with the aid of the same moulds it is possible to build truck bodies of various dimensions. Depending on the number of side wall panels the length of the body may be varied and a variation in height may be realized by varying of the panels at the points at which they are attached to the floor frame or the chassis.

The above-discussed building method using standard panels also makes it possible to manufacture said panels for stock. Their simple shape allows them to be piled up so that they take up little room. The manufacture of panels for stock in its turn contributes to a rapid production of the truck bodies and to the possibility of rapid repair.

According to the invention an advantageous embodiment of the wall panels is further characterized in that the flanges are thicker than the wall, and in that of every two joined flanges one is bent over the edge of the other flange.

Preferably said flanges are in their outer surfaces provided with longitudinal grooves which may be filled with packing.

The above-described shape of the flanges ensures very strong rigidity of the truck body. Moreover, the bent edges lend themselves very well for the attaching thereto in longitudinal direction of side planks.

Such side planks are often desired in truck bodies for fastening the goods thereto with the aid of ropes. The side planks as well as the floor may be made of wood. However, it has been found advantageous if both the floor and the side planks are made of the same material as the wall panels. It is even possible not to have the frame to which the floor is attached consist of metal, as is usual, but of the synthetic material used for the wall panels. This may further contribute to a reduction of the empty weight of the vehicle.

The shape of the panels and the presence of the flanges may, according to the invention, be taken additional advantage of in assembling the truck body if the superstructure, with the flange connections between adjoining panels of the longitudinal walls, fits against profiled sections secured to the chassis, and is attached to said sections.

To this end these sections, which need only be simple angle sections having a small length, are in the case of a metal floor frame welded thereto vertically along the circumference thereof.

The bent flanges of the side wall panels closely fit for part of their length in these profiled sections. The adjoining parts of the flanges and the angle section are firmly attached to one another, for instance with the aid of bolts.

According to the invention additional rigidity is imparted to the truck body by so shaping the wall panels that the walls are longitudinally profiled. In addition to its application to the above-described truck body the invention relates to the wall panels forming said truck body and to the method for the manufacture of said panels.

This method is characterized in that in a known manner polyester resin, a mixture of polyester resin and glass fibre, and again polyester resin are successively brought into a mould, for instance by spraying and blowing, which mould is provided with two-step rims, and in that in this mould the moulding is at its edges partially provided with a single flange and partially with a double flange bent in opposite directions, which flanges are obtained by entirely or partially covering the rim of the mould.

This method is particularly suitable for the manufacture of panels the height of which deviates from the standard height. For by placing a loose strip in the mould between the raised sides thereof the lower edge of the wall panel to be formed may be at any desired point in the mould. Similarly, it is possible to manufacture in the same mould panels for a truck body having a deviating roof width.

Consequently, a single mould suffices for the manufacture of side wall panels for truck bodies having greatly varying length, height, and width. This must be considered a remarkable advantage of the construction of the truck body according to the invention and of the method for the manufacture of the wall panels thereof.

If the moulding of the panels is started and finished by applying polyester resin alone, remarkable smooth surfaces are obtained and moreover the truck body is rendered even more weather-resistant.

The glass fibres may as loose fibres be incorporated randomly distributed in the moulding. Another conceivable method comprises incorporating in the moulding a fabric of glass filament yarn.

To obtain a perfectly smooth product, the mould should be as smooth as possible and very accurate to size.

According to the invention such a mould may be obtained if it is manufactured from the same material as the moulding, and is shaped on a male mould which is also made from this same material, which male mould is in its turn shaped in a metal mould.

This last-mentioned metal mould may be shaped from a sheet which is bent in a longitudinal direction and which is enclosed between profiled strips, which are drawn together by means of tie bolts.

The female mould finally obtained may be accurately shaped and finished, because the male mould is made of a material which permits minor corrections.

A particular advantage in the manufacture of the moulded articles in the above-described mould is obtained if the female mould is mounted in a supporting frame in such a way that it is rotatable on a shaft parallel to the edge of the roof.

By always so positioning the mould that the polyester resin is applied to a horizontal surface, the resin is prevented from sagging. Such sagging is always likely if a moulding is to be made in such a manner that the polyester resin is to be applied to vertical or steeply inclined surfaces.

Figure 4:
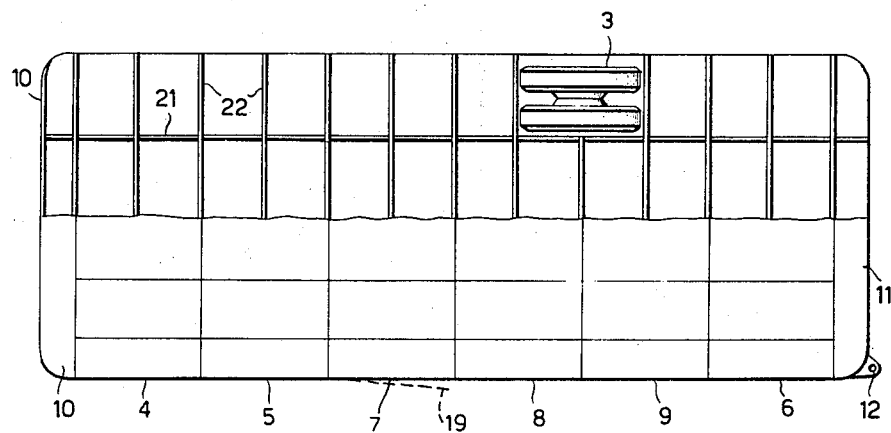

The invention will now be elucidated with reference to the accompanying drawing, in which:

FIG. 1 represents a side elevation of a vehicle provided with a truck body according to the invention;
FIG. 2 is a front view thereof;
FIG. 3 is a back view of the same vehicle;
FIG. 4 represents the same vehicle partially in plan view and partially in inverted plan view;
FIG. 5 shows on an enlarged scale a detail along line V—V in FIG. 1;
FIG. 6 shows on a further enlarged scale a detail along line VI—VI in FIG. 5;
FIG. 7 shows on an enlarged scale a detail along line VII—VII in FIG. 2;
FIG. 8 represents a cross-section of a metal mould;
FIG. 9 represents a cross-section of a female mould containing a moulding; and
FIG. 10 represents an inverted plan view on an enlarged scale of a detail of the roof construction shown in FIG. 5.

In FIG. 1 the numeral 1 refers to a series of lines which indicate the levels of main parts of the chassis of the vehicle, to which main parts the floor frame and the truck body are attached.

Attached to the floor frame is the floor 2 of the body. Also attached to the floor frame, in a manner to be described hereinafter, is the superstructure of the body. The superstructure is made up of said wall panels and front and back wall panels which are all profiled in order to increase the rigidity of the truck body. Of the side wall shown in FIG. 1 the panels 4, 5 and 6 are normal side wall panels. They extend from the lower edge of the side wall to the middle of the roof. These panels are consequently substantially L-shaped. A deviating panel is the side wall panel 7 which extends only as far as the door 19. Also deviating are the panels 8 and 9 which show arches for the wheels 3. The front of the truck body is formed by the front wall panel 10 which is shaped in the same mould as the frame 11 of the back wall.

Attached to said frame 11 are the hinges 12, 13, 14 and 15 on which the doors 16 and 17 are hung. For the rearlight section 18 a separate panel is shaped. All the panels as well as the mud guards 20 are made of fibre glass reinforced polyester resin.

All the wall panels are secured to one another and to the floor frame by means of bolts and nuts. The upper half of FIG. 4 is a view of the floor frame.

The floor frame consists of a few girders 21 of U-section which extend for the entire length of the vehicle, and of a series of U-section girders 22 which are attached to the longitudinal girders in transverse direction, in which they extend across the entire width of the vehicle.

As shown in FIG. 5, which represents a partial cross-section along line V—V in FIG. 1, to the end of every other transverse girder 22 a short angle section 23 is welded. These angle sections 23 serve to secure thereto the wall panels by means of bolts 24, 25, 26.

The construction of this connection is shown in FIG. 6 on a highly enlarged scale.

This figure shows a cross-section of the connection of two adjoining panels at line VI—VI in FIG. 5. The panel 4 is at its edge provided with a relatively thick flange 33 which is contiguous with the double-bend flange 34 of the wall panel 5. This last mentioned flange fits in the angle section 23.

The parts 33, 34 and 23 are drawn together by means of bolts. Several washers or locking rings may be applied in a known manner to obtain a better and more durable joint. In order to make the seams between the various panels water-tight a packing 32 of a suitable elastomeric material is inserted in special grooves which are provided in the flange in the entire length thereof. It should be added that said panels are at their adjoining flanges everywhere connected in the same manner as shown in FIG. 6 for the attachment of said panels to the angle sections 23.

In the places where there are no angle sections 23 planks 27 are horizontally attached to the flanges 34 along the entire height of the walls. Since the planks 27 consist of fibre glass reinforced resin, they may be attached simply by cementing them to the flanges with the aid of polyester resin.

FIG. 5 also shows how in the middle of the roof and along the length thereof the facing side panels, for instance 5 and 28, are joined with their flanges 29 and 30 by means of bolts.

FIG. 7 represents on an enlarged scale a detail along line VII—VII in FIG. 2 and shows that the end wall panels, for instance 10, are joined with the side wall panels, for instance 4, in a manner similar to that in which the side wall panels are inter-connected.

FIG. 8 shows a schematic cross-section of a device which serves to shape moulds for the manufacture of the side wall panels. Two strips 36 and 37 enclose a metal sheet 35 which is substantially L-shaped transverse to the plane of the drawing.

The strips 36 and 37 are drawn together by means of tie rods 39 which are threaded at the ends, the sheet 35 being supported and kept in position by means of spacer tubes 38 which are slipped on the tie rods.

Into this assembly first a layer of polyester resin is sprayed which covers the sheet 35 entirely and the strips 36 and 37 as far as the outer raised edges. Subsequently, polyester resin is sprayed on to this layer on which, simultaneously, fibre glass is blown, after which a further coat of resin alone is applied.

The polyester contains a catalyst and an accelerator, as a result of which the resin polymerizes at room temperature and cures. The moulding obtained is removed from the metal mould and in its turn used as male mould to correspondingly shape therewith the female mould 40 shown in FIG. 9. If necessary, the two moulds may still be finished to accurate shape before a final side wall panel 41 is shaped therein.

At one side of the mould the polyester resin is sprayed further than at the other, as a result of which the two differently shaped flanges 33 and 34 are obtained which for the sake of clearness are shown relatively thick in FIG. 9.

During manufacture of the wall panel 41 the female mould 40 is mounted in a supporting frame (not shown) which may be tilted on a shaft which is parallel to the roof edge of the panel.

The object thereof has already been explained hereinbefore.

FIG. 10 shows an inverted plan view of part of the longitudinal connection in the middle of the roof. The slat 42 has been partly broken away to show the staggering of the flanges 29. These staggered flanges are connected by cementing to the slat 42. This construction enhances considerably the longitudinal strength of the roof construction.

What I claim is:

A truck body comprising a floor and a superstructure attached to a truck chassis, said superstructure having side wall portions and a roof portion defined by panels of synthetic resin material joined together at the edges thereof, the joining edges of said panels having integral flanges and one of said joining edges having a bent-over portion extending over the edge of the adjoining panel, said panels having an L-shape and having adjoining edges at the center of the roof portion and, a portion of each of said panels extending downward to define the side wall portions, a plurality of said panels extending downward for the entire height of the side wall portions, said edges of the panels being oriented in a direction perpendicular with respect to the longitudinal axis of the truck body, said integral flanges being thicker than the wall portions of said panels, and the bent-over portions of the flanges along the middle of the roof portion being staggered and having a longitudinal slat attached thereto.

References Cited by the Examiner

UNITED STATES PATENTS

| | | | |
|---|---|---|---|
| 432,272 | 7/1890 | Harvey. | |
| 926,416 | 6/1909 | Hopkins | 105—409 |
| 1,155,717 | 10/1915 | Fouts. | |
| 1,838,522 | 12/1931 | Beardsley et al. | 264—309 |
| 1,953,515 | 4/1934 | Smith | 296—28 |
| 2,165,099 | 7/1939 | Hansen | 264—309 |
| 2,344,092 | 3/1944 | Komenda | 296—31 |
| 2,734,227 | 2/1956 | Costick et al. | 18—39 |
| 2,867,003 | 1/1959 | Stiles | 18—39 |
| 2,883,233 | 4/1959 | Beckley | 296—31 X |
| 3,003,188 | 10/1961 | Weiss | 296—28 X |
| 3,003,810 | 10/1961 | Kloote et al. | 296—31 |
| 3,084,973 | 4/1963 | Beckley | 296—31 |
| 3,100,458 | 8/1963 | Baker et al. | 296—31 X |

FOREIGN PATENTS

| | | |
|---|---|---|
| 760,582 | 12/1933 | France. |
| 712,917 | 8/1954 | Great Britain. |

OTHER REFERENCES

Article: A New Method of Bus Body Construction, in Automotive Industries, December 12, 1936, pages 822 and 823.

BENJAMIN HERSH, Primary Examiner.

WILLIAM J. STEPHENSON, A. HARRY LEVY, Examiners.

E. E. PORTER, Assistant Examiner.